Feb. 7, 1956 P. ALIMAS 2,733,538
FISHING LINE NONTWIST LEADING PLATE
Filed May 21, 1952
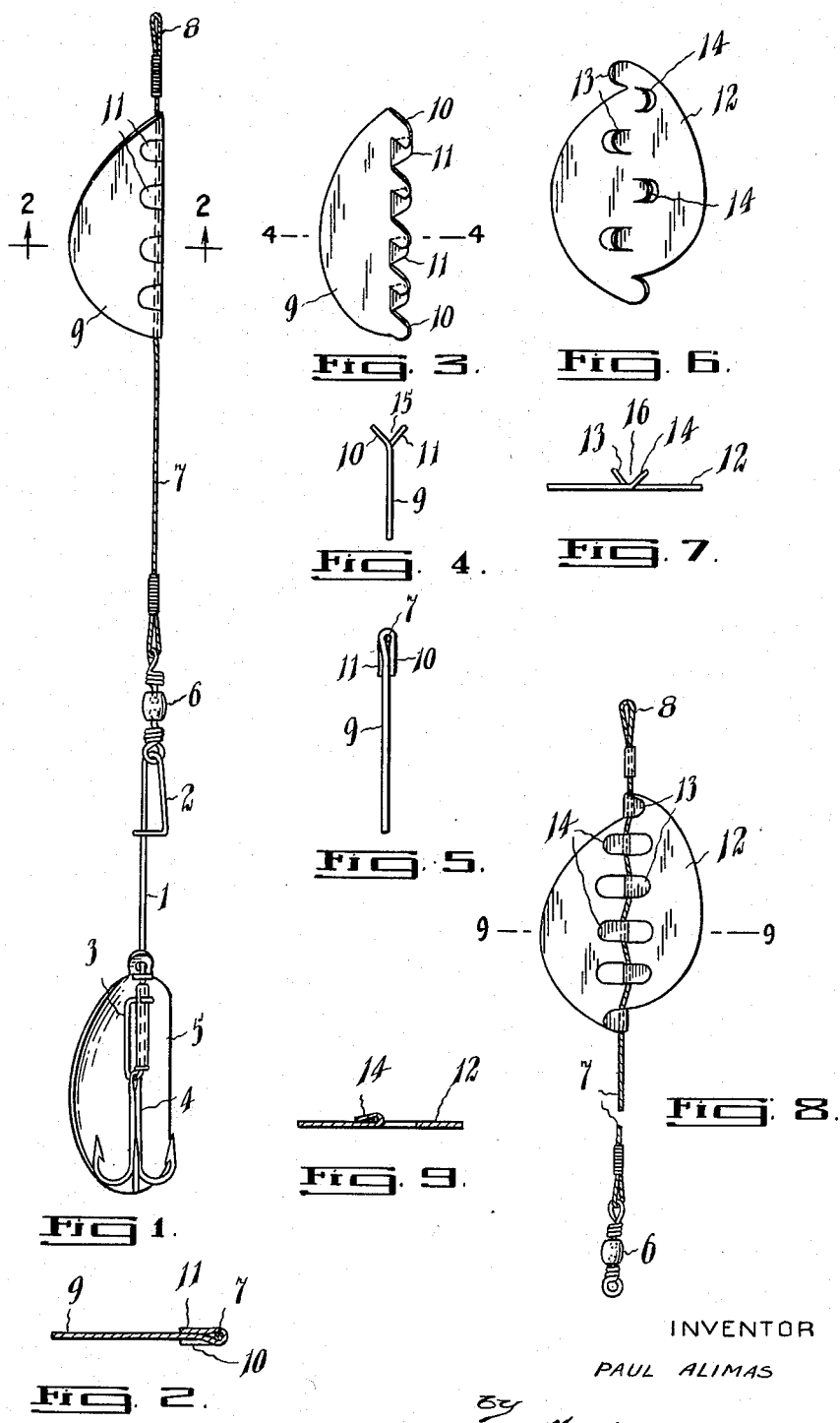
INVENTOR
PAUL ALIMAS
BY
Frederick E. Bromley
ATTY.

United States Patent Office 2,733,538
Patented Feb. 7, 1956

2,733,538

FISHING LINE NONTWIST LEADING PLATE

Paul Alimas, Toronto, Ontario, Canada

Application May 21, 1952, Serial No. 289,168

1 Claim. (Cl. 43—43.13)

This invention relates to attachments for use with fishing lures and lines to resist twisting of the line as a result of the motions or movements of the lure as the latter is drawn through the water by the line. While the lure is usually connected to the main line, either directly or through an intermediate lead line or leader, by means of a swivel joint which permits the lure to revolve relative to the line, there is still danger of the line twisting, and the object of the present invention is to devise a twist-resisting attachment which may be readily attached to either the main line or to the intervening lead line without disconnecting or disturbing in any way the lure or the line or the ordinary connections between them.

A further object of the invention is to construct the attachment in the form of a plate having means integral therewith for attaching it to the line, which means comprises a plurality of tongues adapted to be bent back against the main body of the plate to clamp the line between the tongues and plate to prevent relative movement between the line and plate.

A still further object is to provide a special arrangement of these tongues in which they are arranged in two series with the tongues in one series alternating with those of the other series, which two series of tongues are adapted to be bent over the line from opposite sides to provide a more secure grip on the line.

The above and other objects which will hereinafter appear are attained by means of the constructions herein described and illustrated in the accompanying drawings in which Fig. 1 is a side elevation of a fishing lure with the twist-resisting attachment thereon;

Fig. 2 is an enlarged section on the line 2—2 in Fig. 1;

Fig. 3 is a perspective view of the twist-resisting attachment;

Fig. 4 is a section on the line 4—4 in Fig. 3;

Fig. 5 is a view similar to Fig. 4 showing the plate clamping the line;

Fig. 6 is a side view of a modified form of plate;

Fig. 7 is an end view of the same; and

Fig. 8 is a side view showing the plate of Fig. 6 attached to a lead line;

Fig. 9 is a cross section on line 9—9 of Fig. 8.

In the drawings like numerals of reference indicate corresponding parts in the different figures.

In Fig. 1 is shown a common type of fishing lure comprising a shank 1 bent to form a loop 2 at its lead end and a loop 3 at its trailing end. To the loop 3 is connected a gang hook 4. Slidably and rotatably mounted on the shank 1 between the loops 2 and 3 is a spoon 5.

To the leading loop 2 is connected one end of a conventional type swivel joint 6, while to the other end of the swivel joint is connected one end of a lead line or leader 7, which is provided with a loop 8 at its other end to which the main line is connected.

While the swivel joint reduces the danger of line twisting as a result of the movements of the lure and spoon, it is found that even with the swivel joint the line does at times show a tendency to twist, and to reduce this tendency I mount on the lead line 7 the twist-resisting attachment now described.

This attachment comprises a plate 9 of substantially semi-oval shape with a substantially straight side, and with the smaller end of the plate directed towards the loop 8. Projecting from the straight side of the plate is a plurality of tongues, which are arranged in two series 10 and 11, with the tongues of the one series alternated with the tongues of the other series. To facilitate the mounting of the attachment on the line, the tongues in the two series are arranged in diverging relationship as shown in Fig. 4 to form between them a V-shaped line-receiving seat 15. To position the attachment on the line, the tongues in the two series are bent in opposite directions over the line 7 to clamp the line in place as indicated in Figs. 2 and 5.

The plate 9 will be formed of comparatively thin and light material, although of sufficient stiffness to maintain its shape under normal conditions of use, and the tongues 10 and 11 may therefore be bent back against the face of the plate to clamp the line with a minimum of effort and may be made to tightly engage the face of the plate by tapping them with a hammer or by squeezing with a pair of pliers.

The plate 9 has preferably a dull or non-light reflecting surface so as to be inconspicuous when drawn through water and therefore not detract attention from the hook portion of the lure.

As the alternating tongues in the two series extend over the line from opposite directions, there is no danger of the attachment becoming disengaged from the line.

A modified form of attachment is shown in Figs. 6 to 8. In this form a plate 12 is roughly of oval shape having a longitudinal axis bisecting the plate into two sections having front and rear ends. One half of the oval is advanced ahead of the other half and thus provides at the front of the advanced semi-oval section a forward terminus. Similarly there is provided on the rear of the other semi-oval section a rearward terminus. A clamping tongue is fashioned integrally with said forward terminus and extends away therefrom with its base at the longitudinal axis. A clamping tongue is fashioned integrally with said rearward terminus and extends away therefrom with its base also at the longitudinal axis. A plurality of clamping tongues are struck from said plate at a side face thereof to extend transversely in two opposite series, as at 13 and 14. The tongues of one series are disposed alternately to those of the other and each tongue of both series has its base at the longitudinal axis. All of the tongues aforesaid are bent to form a V-shaped seat 16, Figs. 6 and 7, in which said leader is placed. Further, all of the tongues are finally bent over the leader and flattened against the adjacent side of the plate to clamp the leader in a slightly zig-zag manner through its length, as shown in Fig. 8.

Either form of the attachment, when firmly clamped on the line, will, when the lure is drawn through the water, act in the manner of a rudder and resist any tendency of the line to rotate or twist.

While the attachment is shown mounted on a line which includes a leader or lead line, it will be evident that with lures where such leaders or lead lines are not used, the attachment may be mounted directly on the main line itself close to the swivel joint which secures the lure to the line.

It will also be understood that the particular type of lure shown is only for illustrative purposes, as the twist-resisting attachment may be used in conjunction with a line attached to any other type of lure.

What I claim is:

A twist-resisting attachment for a leader of a fishing line, comprising a thin flat plate of a general oval configuration having a longitudinal axis bisecting the plate into two substantially semi-oval portions having front and rear ends, one semi-oval portion of the oval being advanced ahead of the other whereby said plate defines at the front of the advanced semi-oval portion a forward terminus, and similarly defines on the rear of the other semi-oval portion a rearward terminus, a clamping tongue integral with said forward terminus with its base at the longitudinal axis, a clamping tongue integral with rearward terminus with its base at the longitudinal axis, and a plurality of clamping tongues struck from said plate at a side face thereof to extend transversely and disposed in two opposite series, the tongues of one series being disposed alternately to those of the other and each tongue of both series having its base at the longitudinal axis, and all of the aforesaid tongues being alternately bent to form a substantially V-shaped seat adapted to receive a leader, and all of the aforesaid tongues adapted to be further bent over the leader and flattened against the plate whereby said tongues serve to clamp the leader to the plate in a zig-zag manner along its length.

References Cited in the file of this patent

UNITED STATES PATENTS

| | | |
|---|---|---|
| 399,866 | Gage | Mar. 19, 1889 |
| 942,009 | Mueller | Nov. 30, 1909 |
| 1,050,034 | Mayerle | Jan. 7, 1913 |
| 1,161,559 | Weigel | Nov. 23, 1915 |
| 1,784,679 | Paterson | Dec. 9, 1930 |
| 1,795,205 | Fenderson | Mar. 3, 1931 |

FOREIGN PATENTS

| | | |
|---|---|---|
| 114,782 | Sweden | Sept. 4, 1945 |